(12) United States Patent
Goldberg et al.

(10) Patent No.: US 8,863,258 B2
(45) Date of Patent: Oct. 14, 2014

(54) SECURITY FOR FUTURE LOG-ON LOCATION

(75) Inventors: Itzhack Goldberg, Hadera (IL); Boaz Mizrachi, Haifa (IL)

(73) Assignee: International Business Machines Corporation, Armonk, NY (US)

( * ) Notice: Subject to any disclaimer, the term of this patent is extended or adjusted under 35 U.S.C. 154(b) by 55 days.

(21) Appl. No.: 13/217,175

(22) Filed: Aug. 24, 2011

(65) Prior Publication Data

US 2013/0055370 A1    Feb. 28, 2013

(51) Int. Cl.
| | | |
|---|---|---|
| H04L 9/32 | (2006.01) | |
| G06F 21/00 | (2013.01) | |
| G06F 12/02 | (2006.01) | |
| G06F 21/31 | (2013.01) | |
| G06F 17/30 | (2006.01) | |
| H04W 4/02 | (2009.01) | |

(52) U.S. Cl.
CPC .......... *G06F 21/31* (2013.01); *G06F 17/30864* (2013.01); *H04W 4/028* (2013.01); *G06F 2221/2111* (2013.01)
USPC ...................... 726/7; 726/4; 726/5; 455/456.1

(58) Field of Classification Search
None
See application file for complete search history.

(56) References Cited

U.S. PATENT DOCUMENTS

| | | | |
|---|---|---|---|
| 5,659,596 A * | 8/1997 | Dunn ........................ | 455/456.1 |
| 6,178,511 B1 * | 1/2001 | Cohen et al. ...................... | 726/6 |
| 6,275,944 B1 * | 8/2001 | Kao et al. ......................... | 726/36 |
| 6,910,132 B1 * | 6/2005 | Bhattacharya ................. | 713/186 |
| 7,216,361 B1 * | 5/2007 | Roskind et al. ..................... | 726/9 |
| 7,376,431 B2 * | 5/2008 | Niedermeyer ............... | 455/456.3 |
| 7,690,995 B2 * | 4/2010 | Frankulin et al. ................ | 463/41 |
| 8,370,908 B2 * | 2/2013 | Gillum et al. ...................... | 726/5 |
| 2002/0018550 A1 * | 2/2002 | Hafez ....................... | 379/211.01 |
| 2004/0059951 A1 * | 3/2004 | Pinkas et al. .................. | 713/202 |
| 2006/0031301 A1 * | 2/2006 | Herz et al. ..................... | 709/206 |
| 2006/0054692 A1 * | 3/2006 | Dickey ........................... | 235/385 |
| 2006/0069921 A1 * | 3/2006 | Camaisa et al. .............. | 713/182 |
| 2006/0101508 A1 * | 5/2006 | Taylor ............................... | 726/7 |
| 2006/0282660 A1 * | 12/2006 | Varghese et al. .............. | 713/155 |
| 2007/0169202 A1 * | 7/2007 | Goldberg et al. ............... | 726/26 |
| 2008/0060052 A1 * | 3/2008 | Hwang et al. ..................... | 726/2 |
| 2008/0114539 A1 * | 5/2008 | Lim .............................. | 701/208 |
| 2008/0222706 A1 * | 9/2008 | Renaud et al. ..................... | 726/4 |
| 2008/0320574 A1 * | 12/2008 | Childress et al. .................. | 726/7 |
| 2009/0054043 A1 * | 2/2009 | Hamilton et al. .......... | 455/414.2 |
| 2009/0103124 A1 * | 4/2009 | Kimura et al. ............... | 358/1.15 |

(Continued)

OTHER PUBLICATIONS

Jiang, "Location-based services and GIS in perspective", 2006, Computers, Environment, and Urban Systems 30, 2006, pp. 712-725.*

(Continued)

*Primary Examiner* — Andrew Nalven
*Assistant Examiner* — Walter Malinowski
(74) *Attorney, Agent, or Firm* — Kenneth L. Sherman, Esq.; Michael Zarrabian, Esq.; Sherman & Zarrabian LLP (57) ABSTRACT

A system includes a location look-up module that determines a current location for a user log-on to the network, and determines a next location of the user log-on to the network. An analyzer module analyzes at least one portion of the network for potential future location information for authenticating with the determined next location by an authorization module. The authorization module authenticates the next log-on to the network based on a comparison with the potential future location information.

14 Claims, 4 Drawing Sheets

(56) References Cited

U.S. PATENT DOCUMENTS

| | | |
|---|---|---|
| 2010/0161906 A1* | 6/2010 | Bolger et al. ............... 711/137 |
| 2010/0164720 A1* | 7/2010 | Kore ............................ 340/541 |
| 2010/0211997 A1 | 8/2010 | McGeehan et al. |
| 2011/0092185 A1* | 4/2011 | Garskof ....................... 455/411 |
| 2011/0246306 A1* | 10/2011 | Blackhurst et al. ........ 705/14.58 |
| 2011/0276639 A1* | 11/2011 | Schrader ..................... 709/206 |
| 2011/0314502 A1* | 12/2011 | Levy et al. .................... 725/46 |
| 2012/0029990 A1* | 2/2012 | Fisher ........................ 705/14.19 |
| 2012/0088476 A1* | 4/2012 | Greenfield ................. 455/414.1 |
| 2012/0116672 A1* | 5/2012 | Forutanpour et al. ......... 701/431 |
| 2012/0144468 A1* | 6/2012 | Pratt et al. ........................ 726/7 |
| 2012/0167189 A1* | 6/2012 | Aichroth et al. ................ 726/7 |
| 2012/0220308 A1* | 8/2012 | Ledlie ........................ 455/456.1 |
| 2012/0233683 A1* | 9/2012 | Ibrahim et al. ................... 726/7 |
| 2012/0278316 A1* | 11/2012 | Reznik ......................... 707/723 |
| 2012/0304260 A1* | 11/2012 | Steeves et al. ..................... 726/5 |
| 2012/0311671 A1* | 12/2012 | Wood et al. ....................... 726/4 |

OTHER PUBLICATIONS

Petch, D., "Location-based login protection", Digital Identity, Feb. 19, 2010, 2 pages, downloaded from http://digitaldebateblogs.typepad.com/digital_identity/2010/02/location-based-login-protection.html on Aug. 23, 2011, United States.

Bardram, J.E., et al., "Context-Aware User Authentication—Supporting Proximity-Based Login in Pervasive Computing," 2003, pp. 107-123, UbiComp 2003: Ubiquitous Computing Lecture Notes in Computer Science, vol. 2864/2003, DOI: 10.1007/978-3-540-39653-6_8, United States.

* cited by examiner

SECURITY FOR FUTURE LOG-ON LOCATION

BACKGROUND

The present invention relates generally to network log-on security, and in particular, log-on security based on location information.

When a user logs on to a network such as a social network, the user typically provides a username or user identification and a password. The user may log-on to the network from a variety of locations, such as home, office, school, etc. The user location at the time of logging onto the network does not affect the log-on process.

BRIEF SUMMARY

Embodiments of the invention enhance network log-on processing for users based on user location information. One embodiment of the invention comprises a computer program product for authenticating network log-on. The computer program product comprising: computer useable code configured to detect current user location based on user information in a network, and to determine potential future log-on location information for that user. In one embodiment of the invention, computer useable code is configured to analyze at least one portion of the network for potential future log-on location information. Computer useable code is further configured to authenticate the next log-on to the network based on the potential future log-on location information.

In one embodiment of the invention, a method includes determining a current log-on location for a user utilizing user information in a network, wherein the log-on is based on log-on credentials. User information in the network is analyzed for potential future log-on location information. A subsequent log-on attempt based on the log-on the credentials is determined. The subsequent log-on attempt based on the potential future log-on location information is authenticated. The subsequent log-on attempt is authorized if the authentication is successful.

In another embodiment of the invention, a system includes at least one client configured for logging in a user to a network. At least one server device is coupled to the network. The server device is coupled with: a location module configured for determining current location based on user information in the network, and for determining a location of a next log-on of the user to the network. An analyzer module is configured for analyzing at least one portion of the network for potential future location information for the user. An authorization module is configured for authenticating the next log-on of the user to the network based on the potential future location information.

Other aspects and advantages of the present invention will become apparent from the following detailed description, which, when taken in conjunction with the drawings, illustrate by way of example the principles of the invention.

DETAILED DESCRIPTION

The following description is made for the purpose of illustrating the general principles of the invention and is not meant to limit the inventive concepts claimed herein. Further, particular features described herein can be used in combination with other described features in each of the various possible combinations and permutations. Unless otherwise specifically defined herein, all terms are to be given their broadest possible interpretation including meanings implied from the specification, as well as meanings understood by those skilled in the art and/or as defined in dictionaries, treatises, etc. The description may disclose several preferred embodiments for file systems, as well as operation and/or component parts thereof. While the following description will be described in terms of file systems and processes for clarity and placing the invention in context, it should be kept in mind that the teachings herein may have broad application to all types of systems, devices and applications.

Embodiments of the invention enhance network log-on processing for users based on user location information. In one embodiment of the invention, a device including a location module is configured for detecting current user location based on user information in a network, and for determining potential future log-on location information for that user. In one embodiment, an analyzer module analyzes at least one portion of the network to extract potential future log-on location information. An authorization module then authenticates the next log-on to the network based on the potential future log-on location information.

Embodiments of the invention further provide log-on authentication based on user location information. One implementation enables preventing unauthorized individuals from accessing a user's network account by using a user's log-on credentials (e.g., username, password, etc.). By utilizing extracted future log-on location information from the network, embodiments of the invention prevent individuals who are unaware of such future log-on information from logging-on to the network (such as a social network) with compromised information.

An advantage of using future plans or explicit future log-on location information over known past log-on locations is that a past log-on pattern may give an impersonator more credibility than the genuine user when the genuine user actually breaks their normal routine, such as flying to a vacation location or traveling out of town. That is, the impersonator that tries to log-on from the past location vicinity of the genuine user is likely to be trusted more than the genuine user since the pattern of past log-on locations would be broken for the user that has traveled to a location not recognized as a past log-on location.

For example, a user of a network, such as a social network, uses a mobile wireless device or a non-mobile device (e.g., a wired or wireless stationary device) to log-on to the social network. The network determines the user's current location by means such as GPS, triangulation, the device's IP information, Wi-Fi information, approximation, extrapolation, any combinations of the above, etc. The determined current location would then be compared to a potential future location either entered explicitly by the user during a previous session or extracted through calendar information, blogs, chat sessions, etc. taking into account the log-on location history.

In one example, the log-on history may be used as a further authentication since basic travel (e.g., car, train, ship, airplane, jet, walking, running, horseback, etc.) from one location to another location takes known ranges of time to accomplish. The history of locations may be used to calculate/extrapolate/interpolate, etc. distance between different log-on locations. For example, a user that logs-on in a library in New York City at 8 AM on Dec. 30, 2011, then logs-on at a coffee shop in Queens, N.Y. at 9 AM. Embodiments of the invention may determine the distance between the two locations based on exact coordinates or estimated coordinates. The system may then use travel times based on extracted information, such as travel plans extracted through calendar applications, blogs, chat sessions, etc.

Based on historical average travel times via the same mode of transportation, acceptable ranges of travel time may be determined for the determined distance. If the determined travel time is within a threshold (e.g., 10%, 20%, etc.) of the difference between the first log-on time and a second log-on time, the system may authorize the second log-on by the user. Otherwise, further authentication would be required, such as security/secret questions, biometrics (e.g., fingerprint, facial recognition, etc.).

In other examples, authentication may be more easily determined. For example, a user that logs-on to the network in Beijing, China, at 8 AM on Dec. 31, 2011 could not possibly be the same user that logs-on in Los Angeles, Calif., United States, at 9 AM on the same date (i.e., Dec. 31, 2011) as the distance between is known to be approximately 6,257 miles, and it would not be possible to use conventional travel means to travel 6,257 miles in one hour. Other factors may also be taken in consideration, such as traveling over international date lines, which results in a log-on on a different date.

In one embodiment, the invention provides a system including a location look-up module that is configured for determining a current location for a user log-on to the network, and for determining a next location of the user log-on to the network. An analyzer module is configured for analyzing at least one portion of the network for potential future location information for authenticating with the determined next location by an authorization module. The authorization module is configured for authenticating the next log-on to the network based on a comparison with the potential future location information.

Figure 1:
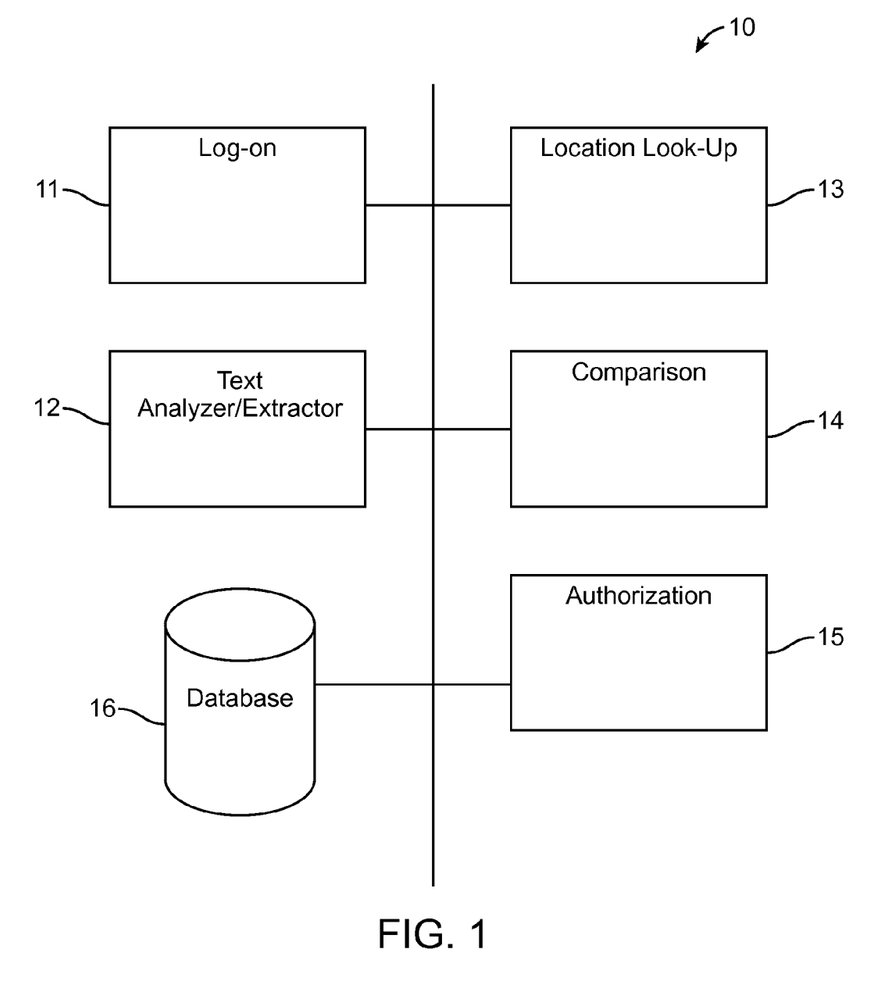
FIG. 1 shows a block diagram of an apparatus and components for authenticating network log-on, according to an embodiment of the invention.

FIG. 1 shows a block diagram of a log-on authenticator system 10 configured for providing log-on authentication based on user location information and preventing unauthorized individuals from accessing a user's network account. In one embodiment of the invention, the log-on authenticator 10 includes a log-on module 11, a text analyzer/extractor module 12, a location look-up module 13, a comparison module 14, and an authorization module 15, according to the embodiment of the invention described above. In one example, the log-on authenticator 10 communicates with a database 16, which may be internal or external to the log-on authenticator 10. In one embodiment of the invention, database 16 may be stored in any memory device, memory structure, component, virtual device, etc., for storing user information including: user location information (e.g., geographical latitude/longitude, city, state, country, province, name of place, etc.), calendar information (e.g., dates, times, etc.), log-in/log-out dates/times, identification (ID) information (e.g., user IDs, passwords, secret questions/answers, etc.), etc. In one example, the user location information includes one or more of: past (e.g., original port of log-on), present and future (e.g., potential log-on) user location information.

In one embodiment of the invention, the log-on module 11 obtains location information from a user as the user logs on to the network. In one example, the present user location information is obtained based on an Internet Protocol (IP) address the user employs to log-on to the network. Location information may be detected from an IP address via a conversion application or look-up application, as is known. In other examples, the user location information may be obtained based on an explicit user input (obtained via a text query, a dropdown menu, etc.), known/computed/estimated/extrapolated geographical location of a stationary or mobile wired/wireless device (e.g., computer, terminal, smart phone, tablet, etc.) that the user employs to log-on to the network, a Global Positioning System (GPS) device associated with (e.g., attached or disposed within) the stationary or mobile wired/wireless device, triangulation of a transmission from/to the stationary or mobile wired/wireless device, any combination of the above, etc. In one example, the location information obtained via explicit user input relates only to future location information.

In one embodiment of the invention, the user location information obtained via the log-on module 11 may be stored in the database 16, locally on a file in the computer employed by the user for log-on, or on a remote file via a client application. In one implementation, the log-on module 11 may time-stamp the location information with time information such that the authorization module 15 may determine whether a subsequent log-on attempt to the network by an individual (or computer) using a same username may be authorized by comparing log-on times associated with location information. For example, if a user utilizes his specific username to log-on to the network at 1 PM PST in a California location, a subsequent log-on by an individual using the same username at 2 PM PST in a New York location would be suspect. This is because using current transportation means, an individual cannot physically travel from California to New York within an hour. As a result, using the time-stamp information the authorization module 15 will not authorize the subsequent log-on and the individual using the same username would be denied access.

In one embodiment of the invention, the text analyzer module 12 scans and analyzes various user associated portions of a network where text information is processed (e.g., created, exchanged, submitted or stored by users, administrators or software applications) in the network. In one example, the various portions of the network may include information technology resources including a user's chat session, a user's blog, a user's postings, a user's message exchanges with other users, a user's picture/video descriptions, etc.

In one example, the text analyzer module 12 searches key terms in the scanned text to find information related to user location (e.g., city, state, country, province, zip codes, phone area codes, country codes, school names, mall names, airport names/codes, amusement park names, event names, sporting events, fairs, festivals, rallies, protests, etc.). The information related to user location (i.e., related location information) is then extracted and stored in the database 16 as potential future log-on locations for subsequent log-on attempt authentication as described below. In one embodiment of the invention, at the time of log-on or log-out, potential future log-on location information is based on explicit user input. In one example, explicit location information of potential future log-on location is provided by a user after log-on authentication takes place, but before the user gains access to the network resources. In this example, the authenticator system 10 obtains the user future location information from a user before log-off, which may not even occur if a user leaves a session without logging off and before the user may start to use the resources of the network, which is the purpose of logging-on. In this example, the user provides information regarding the potential next log-on location, such as home, vacation site, another country/continent, etc. This explicit future location information may then be stored in the database 16 for future authentication by the authorization module 15.

In one embodiment of the invention, the location look-up module 13 utilizes the related location information (extracted by the text analyzer/extractor module 12 or obtained via explicit user input) and looks-up pre-stored geographical locations in a location table in the database 16 that are associated with the related location information. In one implementation, the pre-stored geographical location information includes one or more location names that are associated with geographical coordinates, ranges or identifications. In one implementation, when the related information comprises a name, such as name of an amusement park, the location look-up module 13 performs a search in the location table for the name of the amusement park and returns to the location look-up module any associated geographical location information related to any names matching the name of the amusement park. Different matching criteria may be used. In one example the match can be a partial match or best available match.

In one embodiment of the invention, the comparison module 14 utilizes user location information for a current log-on attempt with a username (as obtained via the log-on module 11), and compares the current user location information with user potential future (e.g., next log-on location information) location information obtained from the database 16 or from the look-up module 13 during prior authorized log-on sessions with that username. The comparison information is used by the authorization module 15 to determine whether to allow the current log-on attempt.

In one example, the comparison module 14 determines if the current user location information matches any of the location information extracted by the text analyzer/extractor module 12 or obtained via explicit user input based on a user's last network log-on session with a username, then the user's current log-on is most likely valid and the validation information is sent to the authorization module 15 to authorize the current log-on attempt with that same username.

In one embodiment of the invention, the number of extractions of each particular geographical location from the relation location information is determined. Weights are assigned to the potential next log-on locations based on the number of location extractions (i.e., same or close proximity location), and the comparison module 14 determines whether a match is likely or not for the location information extracted by the text analyzer/extractor module 12 based on a user's last network log-on session with a username using the weighted potential next log-on locations.

In one embodiment of the invention, the time-stamp data applied by the log-on module 11 with the location information from the last user session location information is compared with the matched location information obtained from the comparison module 14 for the authorization module 15 to determine whether a current log-on attempt should be authorized. For example, if a current log-on location information is determined to be Anaheim, Calif., and the extracted location information found to match by the comparison module 14 is determined to be Las Vegas, Nev., the difference in time-stamped log-on information is used to determine whether the Las Vegas, Nev. log-on should be authorized or not. If the difference in the time-stamp information is feasible based on known travel times, a travel time window, etc., then the subsequent log-on may be authorized by the authorization module 15. For example, if the time-stamp difference is two hours, it may be feasible for a user to be transported from Anaheim, Calif. to Las Vegas, Nev. via an airplane within the two hour time difference. If the time-stamp difference is four hours, it may be feasible for a user to be transported via a car, motorcycle, helicopter or airplane within the four hour difference. If the time stamp difference is thirty (30) minutes, it is most likely not feasible for the user to be transported to the location indicated by the subsequent log-on.

In one embodiment of the invention, the comparison module 14 additionally determines a probability of a determined match based on a determination and comparison of various thresholds. In one example, the thresholds are based on feasibility of transportation from a current log-on location to a subsequent log-on location within the time-stamp difference between a current log-on time-stamp and location and a subsequent log-on time-stamp and location. In another example, the determined probability is based on a comparison of the current log-on location to the extracted location information obtained by the text analyzer module 12 and feasibility of the user being at the determined current location based on various travel time estimations using various travel means (e.g., walking, running, car, train, airplane, etc.).

In one embodiment of the invention, a user's calendar information is used to determine whether a user can be authorized for a log-on at a location or not. In one example, the location and time information obtained from a user's calendar is used for comparison to the time and location information of a current log-on attempt by the user. The comparison module 14 compares the calendar information with the current log-on location and time information. A determination is then made by the authorization module 15 whether the log-on is feasible based on a comparison to the user's location and time information obtained from the user's calendar. In one example, if a user has an appointment scheduled for a meeting on Monday at LOAM EST for one hour in New York City, then a log-on attempt with a username associated with this user from anywhere else during the one hour appointment may be determined to be unauthorized without further validation by the authorization module 15 (such as correctly answering secret questions or entering a secret code in addition to a password, etc.). In another example, a log-on attempt determined to be from Long Island, N.Y. on Monday at 10:15 AM EST may also be unauthorized without further validation as fifteen (15) minutes to travel from New York City to Long Island is likely not feasible.

In one embodiment of the invention, the authorization module 15 uses the information regarding matching location information from the comparison module 14 and determines whether to authorize a current log-on to the network by a user or not based on determined probability information. In one example, a probability of a current location matching a potential future log-on location obtained from the comparison module 14 is used to determine whether to authorize a user log-on or not. In one example, if the probability of the current location match with the extracted potential future log-on location is determined to be greater than a threshold (e.g., 60%, 70%, etc.), the user is authorized for a log-on. In another example, if the probability of a match is determined to be below a certain threshold (e.g., 65%, 60%, etc.), further authentication queries may be issued by the authorization module 15, such as additional personal/security questions, secret codes, etc. In other embodiments of the invention, biometrics (e.g., fingerprints, facial recognition, etc.) may be used as further authentication information. In one example, the additional questions are required when a user's plans or potential future log-on locations have changed since the potential future location information was obtained.

Figure 2:
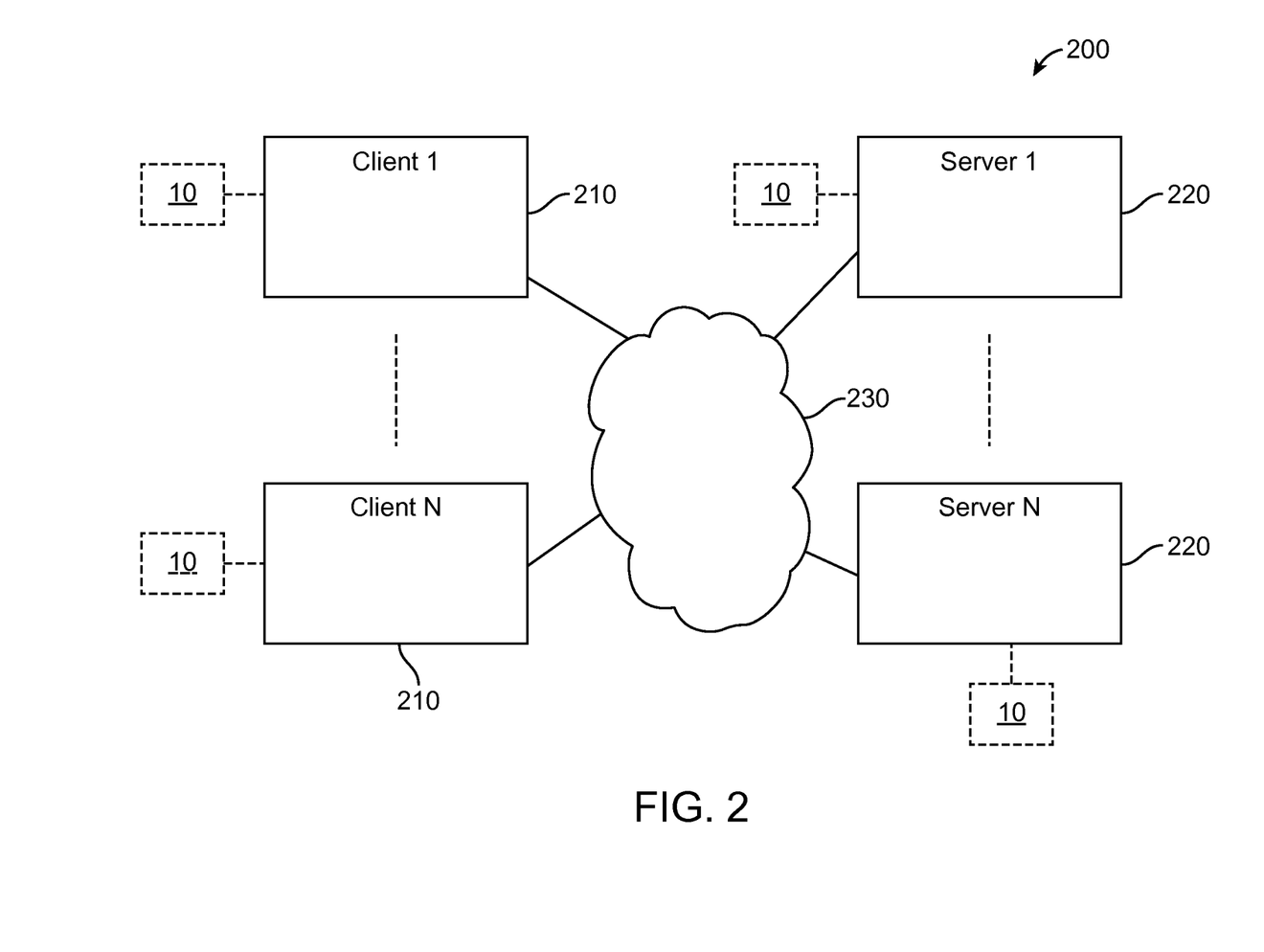
FIG. 2 shows a block diagram of a system and components for log-on authentication, according to an embodiment of the invention.

FIG. 2 shows a block diagram of a system 200 and components for log-on authentication, according to an embodiment of the invention. The system 200 comprises clients 210 (e.g., Clients 1-N), servers 220 (e.g., Servers 1-N), and a network connection 230. In one example, a client 210 may comprise a desktop computer, a laptop computer, a palm computer, a cellular telephone, a tablet, etc. In another example, a client 210 may comprise a browser executed on a processing device.

In one embodiment of the invention, a log-on authenticator 10 is coupled to each client 210. In another embodiment of the invention, a log-on authenticator 10 is coupled to each server 220. In one example, the network connection 230 may be a wired, wireless, a combination of wired and wireless, or any equivalent connection that provides for communication between the clients 210 and the servers 220 and forms a network. In one example, the network connection 230 may comprise multiple Internet connections or other network connections.

In one embodiment of the invention, the clients 210 may communicate with one another through the network connection 230. In one example, a user logs on to a network 200 via a client 210 (e.g., Client 1) using the associated log-on authenticator 10.

Figure 3:
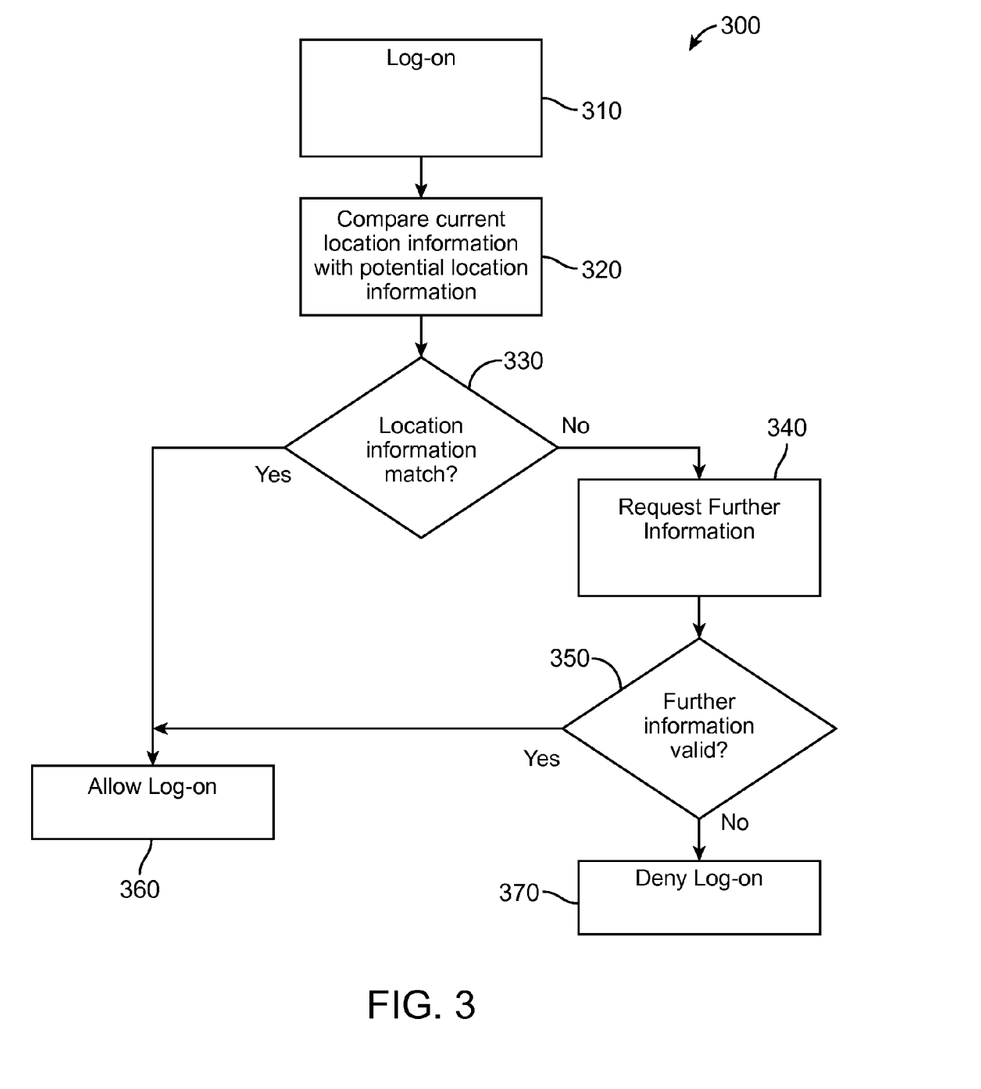
FIG. 3 shows a block diagram of a process for network log-on authentication, according to an embodiment of the invention.

FIG. 3 shows a process 300 for network log-on authentication, according to an embodiment of the invention, comprising:

Process block 310: A user logs-on to a network using log-on credential information, such as a username or user identification, and password. In one embodiment of the invention, the user also provides location information for the location they are logging on from. In other embodiments of the invention, the log-on authenticator 10 determines the user's location based on detection from an IP address via a conversion application or look-up application, as is known; explicit user input, known geographical location of a computer/terminal the user employs to log-on to the network, a GPS device associated with (e.g., attached or disposed within) the computer/terminal, triangulation of a transmission device wireless cellular device, etc.) that is associated with (e.g., connected to, or disposed in) the computer/terminal, etc.

Process block 320: The current location information for a subsequent log-on attempt obtained in process bock 310 is compared with potential location information for a future log-on that was extracted/determined from portions of a network by a text analyzer module 12 based on user interactions with a network or obtained by explicit user input.

Process block 330: It is determined whether location information obtained from a current log-on in process block 310 matches the potential location information extracted in process block 320. If it is determined that the current location information matches the potential location log-on information, the log-on is authorized and process 300 continues to block 360. If it is determined that the current location information does not match the potential location information, the log-on is not authorized and process 300 continues to block 340.

Process block 340: Further log-on authorization information is requested, such as answers to secret questions, further requested identification, etc., since the current location information did not match the potential location information.

Process block 350: Validation of the further requested information is performed. If the further requested information is validated as correct, process 300 continues to block 360. If the further requested information is not validated, process 300 proceeds to block 370.

Process block 360: Log-on access to the network is allowed to proceed for the user.

Process block 370: Log-on access to the network is denied for the user.

Embodiments of the invention can take the form of a computer simulation or program product accessible from a computer-usable or computer-readable medium providing program code for use by or in connection with a computer, processing device, or any instruction execution system. As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, radio frequency (RF), etc., or any suitable combination of the foregoing. Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Figure 4:
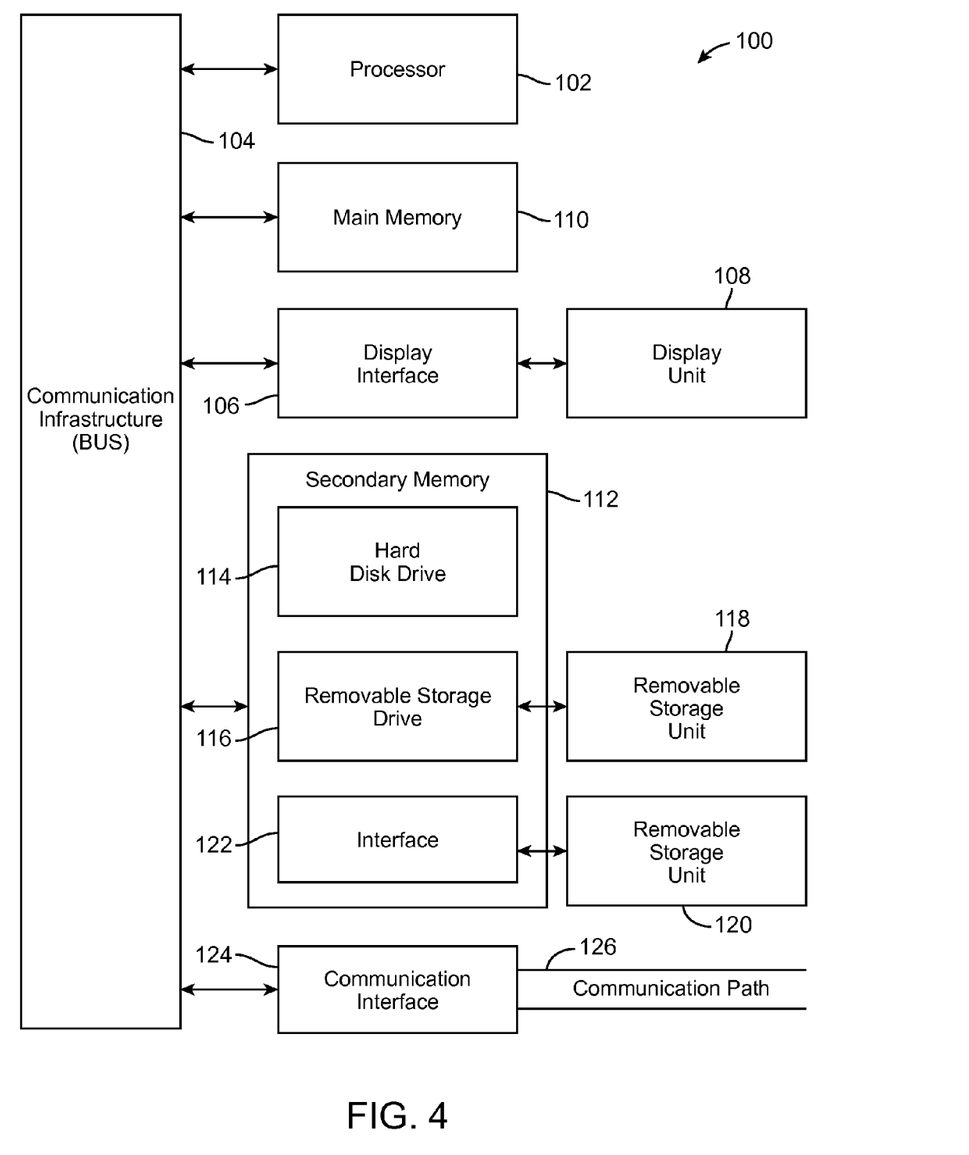
FIG. 4 illustrates a high level block diagram of an information processing system useful for implementing one embodiment of the invention.

FIG. 4 is a high level block diagram showing an information processing system 100 useful for implementing one embodiment of the present invention. The computer system 100 includes one or more processors, such as one or more processors 102. The processor 102 is connected to a communication infrastructure 104 (e.g., a communications bus, cross-over bar, or network).

The computer system can include a display interface 106 that forwards graphics, text, and other data from the communication infrastructure 104 (or from a frame buffer not shown) for display on a display unit 108. The computer system also includes a main memory 110, preferably random access memory (RAM), and may also include a secondary memory 112. The secondary memory 112 may include, for example, a hard disk drive 114 and/or a removable storage drive 116, representing, for example, a floppy disk drive, a magnetic tape drive, or an optical disk drive. The removable storage drive 116 reads from and/or writes to a removable storage unit 118 in a manner well known to those having ordinary skill in the art. Removable storage unit 118 represents, for example, a floppy disk, a compact disc, a magnetic tape, or an optical disk, etc., which is read by and written to by removable storage drive 116. As will be appreciated, the removable storage unit 118 includes a computer readable medium having stored therein computer software and/or data.

In alternative embodiments, the secondary memory 112 may include other similar means for allowing computer programs or other instructions to be loaded into the computer system. Such means may include, for example, a removable storage unit 120 and an interface 122. Examples of such means may include a program package and package interface (such as that found in video game devices), a removable memory chip (such as an EPROM, or PROM) and associated socket, and other removable storage units 120 and interfaces 122 which allow software and data to be transferred from the removable storage unit 120 to the computer system.

The computer system may also include a communications interface 124. Communications interface 124 allows software and data to be transferred between the computer system and external devices. Examples of communications interface 124 may include a modem, a network interface (such as an Ethernet card), a communications port, or a PCMCIA slot and card, etc. Software and data transferred via communications interface 124 are in the form of signals which may be, for example, electronic, electromagnetic, optical, or other signals capable of being received by communications interface 124. These signals are provided to communications interface 124 via a communications path (i.e., channel) 126. This communications path 126 carries signals and may be implemented using wire or cable, fiber optics, a phone line, a cellular phone link, an RF link, and/or other communication channels.

In this document, the terms "computer program medium," "computer usable medium," and "computer readable medium" are used to generally refer to media such as main memory 110 and secondary memory 112, removable storage drive 116, and a hard disk installed in hard disk drive 114.

Computer programs (also called computer control logic) are stored in main memory 110 and/or secondary memory 112. Computer programs may also be received via a communication interface 124. Such computer programs, when run, enable the computer system to perform the features of the present invention as discussed herein. In particular, the computer programs, when run, enable the processor 102 to perform the features of the computer system. Accordingly, such computer programs represent controllers of the computer system.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other modifications may occur to those ordinarily skilled in the art.

What is claimed is:

1. A method of authenticating user log-on to a network, the method comprising:
   determining a current log-on location for a user utilizing user information in a network, wherein the log-on is based on log-on credentials;
   analyzing user information in the network for potential future log-on location information, wherein the potential future log-on location information comprises information provided after log-on authentication and before user access to network resources, and the potential future location information comprises user entered next location information that is explicitly entered at a log-on time or previously entered after log-on authentication of a previous network session in response to a query or a dropdown menu;
   determining a location of a subsequent log-on attempt based on said log-on credentials;
   authenticating said subsequent log-on attempt based on said potential future log-on location information; and
   authorizing said subsequent log-on attempt if said authentication is successful.

2. The method of claim 1, wherein at least one portion of the user information in the network comprising user entered text.

3. The method of claim 1, wherein the user entered next location information is explicitly entered at a logout time of a previous network session in response to a text query or dropdown menu.

4. The method of claim 1, wherein the potential future location information is entered via at least one communication with at least one other user or from a calendar application.

5. The method of claim 1, wherein the network comprising a social network.

6. The method of claim 1, further comprising:
   validating the next log-on based on comparing current log-on location information with the potential future location information.

7. A computer program product for authenticating network log-on, the computer program product comprising:
   a computer readable storage device having computer usable program code embodied therewith, the computer usable code comprising:
   computer usable program code configured to determine current location based on user information in a network, and to determine a location of a next log-on to the network;
   computer usable program code configured to analyze at least one portion of the network for potential future location information, wherein the potential future location information comprises information provided after log-on authentication and before user access to network resources, and the potential future location information comprises user entered next location information that is explicitly entered at a log-on time or previously entered after log-on authentication of a previous network session in response to a text query or a dropdown menu; and
   computer usable program code configured to authenticate the next log-on to the network based on the potential future location information.

8. The computer program product of claim 7, wherein the at least one portion of the network comprising user entered text.

9. The computer program product of claim 7, wherein the potential future location information is entered via at least one communication with at least one other user or from a calendar application.

10. The computer program product of claim 7, further comprising computer useable program code configured to validate the next log-on based on comparing current log-on location information with the potential future location information.

11. A system comprising:
    at least one client configured for logging in a user to a network;
    at least one server device coupled to the network, the server device:
       determines current location based on user information in the network, and for determining a location of a next log-on of the user to the network,
       analyzes at least one portion of the network for potential future location information for the user, wherein the potential future location information comprises user entered next location information that is explicitly entered at a log-on time or previously entered after log-on authentication of a previous network session in response to a text query or a dropdown menu, and
       authenticates the next log-on of the user to the network based on the potential future location information, wherein the potential future log-on location information comprises information provided after log-on authentication and before user access to network resources.

12. The system of claim 11, wherein the at least one portion of the network comprising user entered text.

13. The system of claim 11, wherein the potential future location information is entered via at least one communication between the user and at least one other user or from a calendar application.

14. The system of claim 11, wherein the server validates the next log-on based on comparing current log-on location information with the potential future location information.

* * * * *